Dec. 12, 1967  V. SUIGUSSAAR  3,357,779
MOTION PICTURE CAMERA
Filed July 6, 1964  2 Sheets-Sheet 1
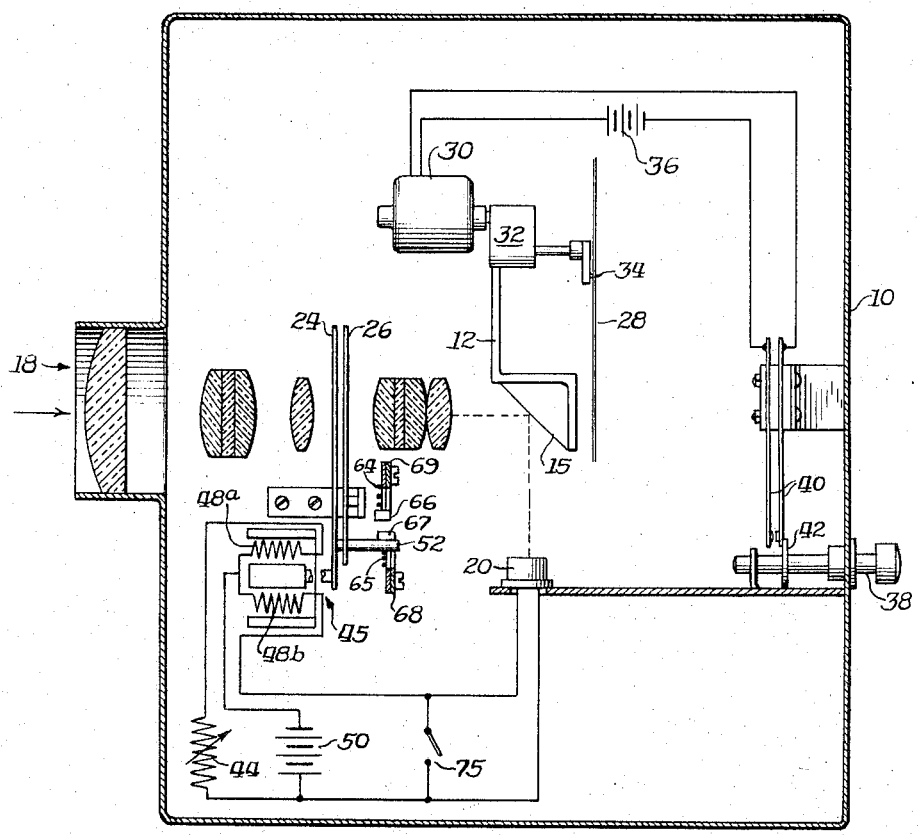
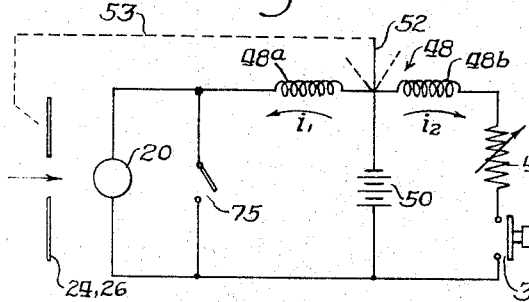
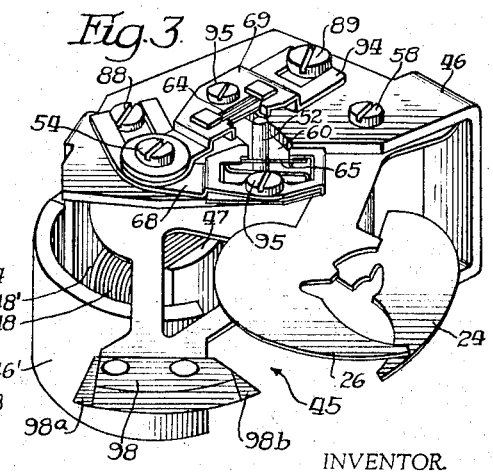
INVENTOR.
Vello Suigussaar.
BY Barry L. Clark
John E. Peele Jr.
Attys Dec. 12, 1967  V. SUIGUSSAAR  3,357,779
MOTION PICTURE CAMERA
Filed July 6, 1964  2 Sheets-Sheet 2
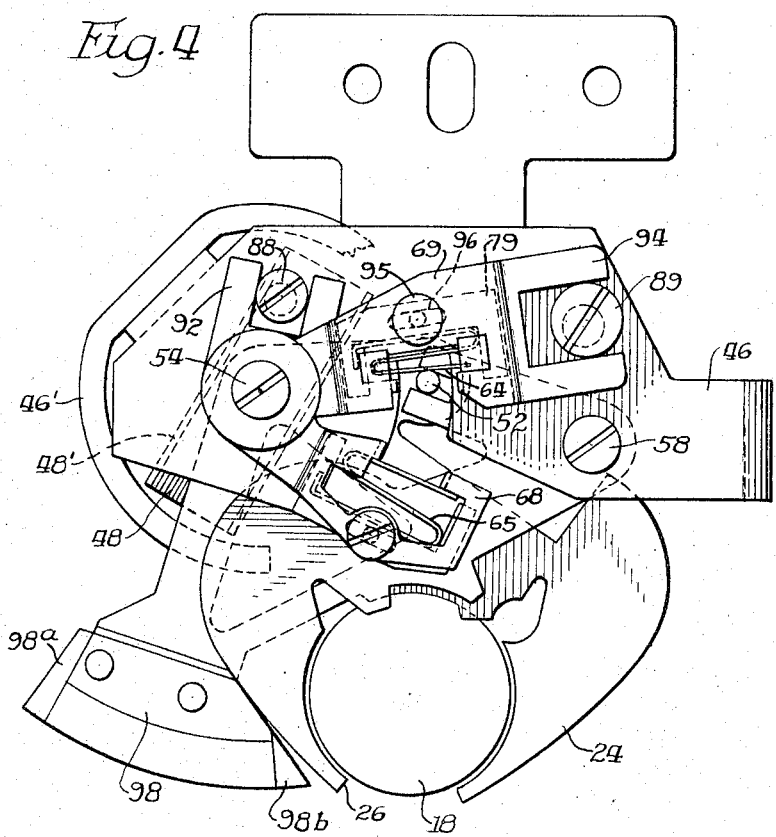
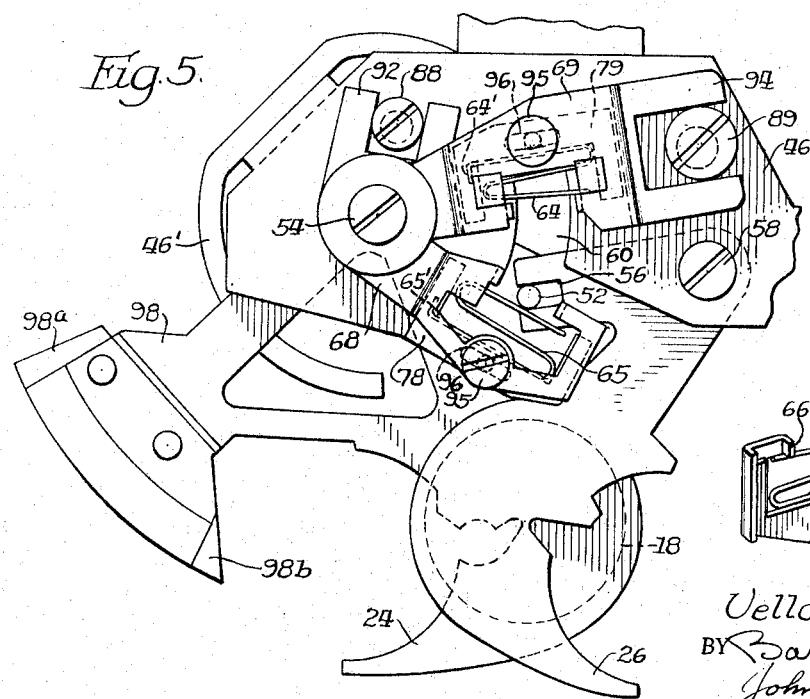
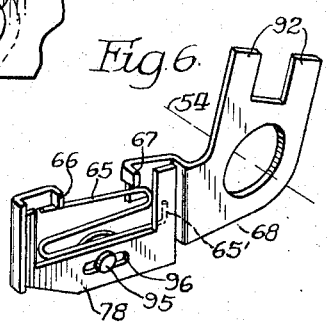
INVENTOR.
Vello Suigussaar.
BY Barry L. Clark
John E. Peele Jr.
Attys.

United States Patent Office 3,357,779
Patented Dec. 12, 1967

3,357,779
MOTION PICTURE CAMERA
Vello Suigussaar, Chicago, Ill., assignor to Bell & Howell Company, Chicago, Ill., a corporation of Illinois
Filed July 6, 1964, Ser. No. 380,204
5 Claims. (Cl. 352—141)

ABSTRACT OF THE DISCLOSURE

An iris blade control assembly for use in a camera having a lens system, iris blades, and an iris blade drive mechanism, the assembly for variably extending the range of operation of the drive mechanism including an adjustable spring means for absorbing energy transmitted from the drive mechanism by a blade and a pin carried on that blade. The adjustment of the spring means relative to the path of the pin serves to permit greater than normal energy to be applied to the drive mechanism.

---

This invention relates to improvements in photography and particularly to an iris blade control assembly for use in a motion picture camera. The improvements enable the range of the assembly and more particularly the range of the galvanometer thereof to be extended to be used as a battery testing device and/or as a means for informing the operator of a predetermined amount of improper exposure beyond the normal indicating range.

A conventional galvanometer of the open loop circuit type includes relatively strong hair or biasing springs to balance the electro-mechanical torque derived from a current through a coil against the torque arising from the springs.

Another type of galvanometer is of the closed loop circuit type employing weak hair springs and having a deflection member and coil intended to assume a position of null or zero current flow difference between a variable loop and a reference loop. In this type, a relatively large current flow difference causes the deflection member to move to an extremity of its range.

The present concept is primarily applicable to the latter type galvanometer, to modify the structure thereof by the addition of yieldable mechanical restraining members near the ends of the movement range. These yieldable retaining members increase the effective length of the path without increasing the physical length thereof, by dissipating the rotational force or torque imparted to a deflection member.

In many portable, battery powered devices, such as motion picture cameras, proper operation is dependent upon maintaining a minimum battery voltage. Therefore, it is desirable to have a built-in battery tester to permit easy, quick testing of the battery in the camera, without the need of extra equipment.

Similarly, since presently available films have relatively wide exposure latitudes, it is possible to obtain acceptable results even if the camera operator should continue filming when the ambient light level is lower than that level normally required for proper exposure. Prior iris blade control assemblies have informed the operator of improper exposure but have failed to provide an accurate determination of the degree thereof. It is well known that at the low light end of the f/stop scale, the necessary movement of the iris blades to encompass an area equivalent to an additional f/stop is usually several degrees. Thus, to open the iris blades beyond the maximum f/stop of which the lens is capable would be undesirable as it would require either an increase of physical size of the meter and camera or a substantial reduction of the normal range of movement. The present concept permits the use of the iris blade control assembly to accurately indicate an underexposure of up to two f/stops with a limited angle of movement.

An object of the present invention is to effectively extend the path of movement of the deflection member of a galvanometer by the insertion of yieldable mechanical restraining members into the ends of the path.

An additional object of the invention is to provide selectively usable yieldable mechanical restraining members to modify the function of a weak spring galvanometer normally used in a closed loop circuit to enable its use to accomplish functions normally attributable to a galvanometer of the conventional type normally used with an open loop circuit.

Another object is to provide yieldable restraining members usable with an iris blade control assembly wherein a camera operator may be continuously apprised of and permitted to improperly expose film a determined amount without substantially compressing the normal exposure range provided for by the assembly and without increasing the physical size thereof.

Still another object of the present invention is to provide an economical battery tester for use in portable equipment having a galvanometer therein, such as motion picture cameras, and in which such galvanometer is also selectively used as a basic element in combination with an auxiliary mechanism to indicate the battery condition.

The foregoing and other objects and advantages of the present invention will become more apparent from the following description when read in conjunction with the drawings forming part of this specification in which:

FIGURE 1 is a schematic view of a motion picture camera disclosing the relationship of various elements and controls of the camera as applicable to an exposure control system incorporating features of the instant invention;

FIGURE 2 is a diagram of the exposure control and battery test circuit;

FIGURE 3 is a perspective view of a meter-iris assembly incorporating the present inventive concepts;

FIGURES 4 and 5 are slightly enlarged views of the assembly in various positions, with some parts omitted for clarity; and FIGURE 6 is an enlarged perspective view of a flexible stop mechanism as used in the instant assembly.

In FIGURE 1 is schematically disclosed a typical motion picture camera having a housing 10 in which a shutter 12 having a reflecting surface 15 on the light interrupting sector thereof reflects the light rays passing through a multiple element lens system 18 to a light sensitive element or photoresistor 20 located behind a pair of swinging iris blades 24, 26. When the reflecting sector is not in the light path from the objective, the light rays impinge upon a film 28 to expose same. The shutter 12 is disclosed as being of the rectilinearly reciprocating type and is driven by a camera drive motor 30 connected thereto through appropriate transmission elements 32, which are further connected to operate shuttle tooth 34 to intermittently move film 28 in the usual manner. The drive motor is electrically powered by batteries 36 and is controlled by the camera start button 38 which extends through housing 10 and controls the motor through electric switch elements 40 which are opened and closed through an actuator link 42 (disclosed as a ring on button 38 since it forms no part of the instant application). This button 38 may be further connected to open and close the circuit of the iris blade control assembly.

The iris blade control assembly includes the photoresistor 20, the iris blades 24, 26, a trimming resistor 44, and a galvanometer 45 including a frame 46, a yoke 46' attached to the frame, a permanent magnet 47 and a coil 48 on a frame 48' rotatable in the magnetic field generated by the magnet. Iris blade 24 is connected to the coil frame 48′ for movement therewith. The coil frame is wound with the usual fine wire to form a pair of windings 48a, 48b of substantially equal current carrying capacity. One end of each of the windings is connected to a common source of current, such as a battery 50 (as seen more clearly in FIGURE 2). The other ends of the windings are respectively connected in circuit with the photoresistor 20 and the trimming resistor 44. A circuit including trimming resistor 44, coil winding 48b, and the battery 50 is considered a reference loop against which the flow of current in the other loop is varied by the resistance changes of photoresistor 20 which are determined by the varying quantity of light striking same. When the current flow through the windings 48a, 48b is unbalanced, the coil frame 48′, the iris blade 24 mounted thereon and the second iris blade 26 connected to be moved with the first iris blade are caused to rotate until a balanced condition is regained by an alteration of the quantity of light striking the photoresistor by adjustment of the iris blades at which time the current flow through the windings in the respective loops is equal. The iris blades 24, 26 are swingably moved in a cooperating manner through a pin and slot connection in which the pin 52 is fixedly mounted in blade 24 for movement therewith as the blade moves about an axis 54. Pin 52 extends perpendicularly of blade 24 and slidably through a slot 56 formed in a portion of blade 26 to cause blade 26 to move about its axis 58 as the blade 24 is rotated. Pin 52 moves in an arcuate path, in an open area 60 in a portion of galvanometer frame 46, which path is selected within the limitations of the degrees of rotary movement of which coil 48 is capable of being moved within the field of magnet 47. This arcuate path exceeds that arc necessary to indicate a normal exposure range by two or three degrees on either end.

Mounted on a portion of galvanometer frame 46 slightly within the ends of the arcuate path is a yieldable mechanical restraining or motion resisting member such as the preferred folded springs 64, 65. These motion resisting members are normally maintained in a slightly compressed position against lugs 66, 67 of the respective adjustable saddle members 68, 69 until further displaced or compressed when engaged by pin 52, which functions as a deflection member. When the coil 48 is rotated to approach an end of the arcuate path so as to engage and compress a spring member, the spring member absorbs a portion of the rotational force generated on the coil by the magnetic field because of an extremely unbalanced condition in current flow through windings 48a, 48b. Such extremely unbalanced conditions occur when the current flow through the winding 48a in the variable loop becomes excessively high or low, for example, when the quantity of light striking the photoresistor is beyond or below the average or normal quantity or when a substantially stronger current is passed through that loop of the circuit, such as when a battery is tested. In either occurrence, the force or torque with which coil 48 is rotatably moved is relatively small, but is sufficient to move pin 52 into engagement with one of the springs 64, 65 to compress it either until the force becomes equal to the resisting force of the spring 64, 65 or until it exceeds the resisting force and engages the inner surface of the fixed but adjustable saddles 68, 69 in the ends of the path of arcuate movement.

The resisting force of the spring is determined by the strength factor for which the springs are selected. The spring thus dissipate the force energy of coil 48 at a factor such that a high degree of current unbalance results in a minimum number of degrees of coil movement. In this preferred embodiment, folded spring 64 is of a different strength than folded spring 65 since the rotational force applied to coil 48 due to unbalance caused by a below normal quantity of light striking photoresistor 20 is substantially less than the rotational force generated by the current from battery 50.

Referring to the circuit diagram of FIGURE 2, a practical closed loop exposure control and battery test circuit are shown in which the current $i_1$ flows in the variable loop and the current $i_2$ flows in the reference loop. The split coil of the galvanometer is indicated by windings 48a, 48b. Pin 52 is here disclosed as connected to the iris blades 24, 26 by a typical blade-galvanometer coupling 53, and is moved by the motion of the coil 48 such that if current $i_1$ in the variable loop is larger than current $i_2$ in the reference loop, the galvanometer coil moves in a direction to reduce the aperture opening as controlled by the position of the iris blades and thereby the amount of light falling on the photoresistor until the resistance of the photoresistor and, thus, the current through the winding 48a in that loop is equal to the resistance of the trimming resistor 44 and the current flowing through the winding 48b in that loop. At that time, coil 48 and the elements moved therewith come to rest in a new position. It is noted that the coil rotates with a torque proportional to the current flowing through the variable loop and since hairsprings used in a galvanometer of the closed loop system are very weak, they alter the torque only slightly.

When the current $i_1$ becomes excessively large, as a result of closing the battery test switch 75 which permits the direct flow of battery current through the variable loop, coil 48 is caused to be rotated until pin 52 engages and a least partially depresses spring 65 until the rotational force or torque applied to the coil is dissipated or equaled by the resisting force of the spring. Current $i_2$ in the reference loop may be ignored, since it applies to the coil an insufficient rotational force to resist the coil rotation caused by the battery current. Similarly, the photoresistor current in the variable loop may be ignored since it is likewise of a minute quantity in comparison with the battery current and is further reduced by the complete closing of the iris blades (as seen in FIGURE 5).

Under low light conditions, the current flowing in the variable loop becomes sufficiently small due to the increased resistance through the photoresistor 20 to permit pin 52 to be moved to the other extremity of its arcuate path and into engagement with spring 64, until the force energy of the coil is dissipated or equaled by the resisting force of the spring.

In the auxiliary mechanisms, primarily the bent end portions 64′, 65′ of each of the spring members 64, 65, as shown in FIGURES 3–5, is respectively held against the adjustable but fixed saddles 68, 69 by one of the U-plates 78, 79. The saddles may be rotated respectively about the screw member through which axis 54 extends, to be angularly adjusted relative to the range of movement of pin 52 to vary the resisting force created by each of springs 64, 65, a portion of which force must be dissipated by pin 52 before the initial movement of the spring. The adjustment further permits limiting the maximum compression of the spring. The angular adjustment of saddles 68, 69 about axis 54 is accomplished by the rotation of eccentric screws 88, 89 threaded into frame 46′ between a pair of legs 92, 94 of the respective saddles. For necessary minor "bench" adjustments because of manufacturing tolerance variations, plates 78, 79 are movable relative to the respective saddles 68, 69 and a threaded screw portion 95 which extends through a slot 96 in each plate (as seen more clearly in the bottom view of saddle 68 in FIGURE 6) to alter the position of engagement of the spring members by the deflection member.

As a result of the resisting force of springs 64, 65, the force applied by the pin 52 is applied against a variable force which is standardized through selection of the spring strength and adjustment of eccentric screws 88, 89 and plates 78, 79. For example, spring 65 may be selected of a strength and adjusted such that the spring will not be moved until the battery voltage exceeds three volts and will then permit pin 52 to move approximately one degree for each additional volt in battery power. Therefore, when the battery provides five volts, the pin and a portion 98a on scale arm 98, which is disclosed as a portion of the iris blade 24, will be moved two degrees relative to an indicator line (not shown) which may be located in the viewfinder or another window (not shown) to indicate to the operator the condition of the battery.

Similarly, the coil 48 moves in the opposite direction and pin 52 engages spring member 64, which is selected for a strength such that pin 52 will move perhaps one degree for an $f/$ stop equivalent in the torque applied against the spring of the flexible stop member by the pin. The rotational force of the coil will be balanced by the resisting force of spring 64 as another portion 98b of the scale arm 98 will be moved into a position to be viewed relative to the indicator line to permit the operator to determine the exact amount of underexposure to which the film will be subjected. It is noted that, in this example, for an equivalent of an additional two $f/$ stops, the iris blades 24, 26 are moved a maximum of two degrees more than the normal area of opening.

In the instant specification, it will be understood that modifications and variations may be effected without departing from the scope of the novel concepts of the present invention.

I claim as my invention:

1. In a camera construction including a lens system, at least one swingable iris blade controlling passage of light through the system, and an automatically operable light sensitive iris blade actuating mechanism including a frame and powered actuating means for swinging the iris blade through a path of movement, the improvements comprising:
   a deflection member movable by said iris blade through a path of movement having a predetermined physical length as said blade is moved by the actuating means;
   yieldable motion resisting means on said frame being operative within an end portion of the movement path of said deflection member to dissipate energy applied through said deflection member by the actuating means and to effectively increase the length of the path of movement of that member within the physical length of said path; and
   means mounting said motion resisting means for adjustment relative to said path wherein said effective path length can be varied.

2. In an iris blade control assembly, the combination comprising:
   a galvanometer having a frame, a movable coil portion carried by said frame, and a magnet on said frame creating a field in which said coil portion is rotatable, said coil portion having a pair of windings through which current flows, the current through one of said windings being of a reference value, and through the other said winding being variable, said coil being rotated by the force generated by the current flow through the windings in the magnetic field when said variable current is different from said reference current;
   an iris blade on said coil portion;
   a deflection member on said iris blade movable along an arcuate path of predetermined physical length when said iris blade is rotated by movement with said coil portion when the current flow through said variable winding changes;
   a pair of saddle members adjustably mounted on said frame within the physical extent of said path; and
   yieldable force dissipating means on each of said saddle members, said saddle members being adjustable to permit positioning of said yieldable means within said path so as to permit the quantity of force necessary to displace said means to be varied and to thereby establish an effective path length greater than said physical path length, wherein when said deflection member is caused to approach the ends of said path, said yieldable means is engaged to dissipate force of said deflection member wherein said rotational force of said coil is permitted to reach substantial values while allowing said iris blade and deflection member limited movement until the current flow through said variable and reference windings is equal.

3. In the combination of iris blade control assembly as in claim 2, a pair of iris blades adapted to slightly overlap when said deflection means displaces one of said yieldable means and said blades are opened slightly beyond their normal maximum opening when said deflection means displaces said other yieldable means.

4. In a camera construction including a lens system, swingable iris blades for controlling the passage of light through the system, and blade adjusting mechanism including powered actuating means for swinging the blades through a range of movement, the actuating means comprising:
   a galvanometer having a frame;
   a magnet on said frame generating a field; and
   a coil rotatable in said field;
   said coil having a pair of windings of substantially equal current carrying capacity, said coil being rotatable by force exerted by said magnetic field when current flow in one of said windings is greater than that through the other winding;
   said galvanometer including weak spring means connecting said windings and coil to a current source from which the flow of current through one said winding is a reference value and through the other said winding is variable;
   an iris blade movable by said coil;
   a deflection means movable with said iris blade in an arcuate path having a physical length, said deflection means being normally capable of movement beyond said physical length of said path when said coil is energized;
   a pair of saddle members on said frame; and
   yieldable energy dissipating means carried on said saddle members, within the ends of said arcuate path and adapted to be engaged by said deflection means when the current flow in said windings causes said deflection means to approach an end of said arcuate path,
   wherein said deflection means engages said energy dissipating means to displace same and dissipate a part of the energy generated by said coil whereby the iris blades and said deflection means can be moved through an effective path length greater than said physical path length until the current flow through the pair of windings becomes substantially the same.

5. In an exposure control system of a camera including a lens system and an iris diaphragm through which light rays are admitted, a galvanometer assembly including a frame, a coil, a pair of windings on said coil, and a magnet on said frame creating a field through which said coil is rotated by current passing through said pair of windings, a first iris blade of said diaphragm mounted on said coil and a second blade of said diaphragm operably connected to said first blade by connection means, a light sensitive element located behind said iris blades in the path of said light rays, a reference current flowing in one of said windings, a variable current flowing in the other of said windings, the latter said winding being in circuit with said light sensitve element, which element causes said current flow to be varied proportionately with the quantity of light rays impinging thereon, whereby said quantity of light rays is varied by said iris blade as a result of the rotation of said coil until said variable current and said reference current are equal, said connection means including a deflection means movable with said blade, and a pair of spring members adjustably positioned on said frame within the path of movement of said deflection means adapted to dissipate force when engaged and displaced as said coil is rotated to approach the end of said arcuate path until a portion of the force applied to said deflection means is dissipated and the current flow through said variable winding is equal to that through the said reference winding.

References Cited
UNITED STATES PATENTS

| | | | |
|---|---|---|---|
| Re. 21,149 | 7/1939 | Tonnies | 95—64 |
| 3,227,056 | 1/1966 | Lieser | 95—64 X |
| 3,227,057 | 1/1966 | Stimson et al. | 95—64 X |
| 3,233,531 | 2/1966 | Fairbanks | 95—64 X |

JULIA E. COINER, *Primary Examiner.*

NORTON ANSHER, *Examiner.*

H. H. FLANDERS, *Assistant Examiner.*